(12) United States Patent
Chalupsky et al.

(10) Patent No.: US 6,364,171 B1
(45) Date of Patent: Apr. 2, 2002

(54) ARTICULATED TRIGGER/COVER UNIT FOR A PUMP DISPENSER

(75) Inventors: William E. Chalupsky, Woodbury, MN (US); Wing-Kwong Keung, Perrysburg, OH (US); Kenneth S. Bloom, Jerry City, OH (US); Ruixin Fan, Perrysburg, OH (US); George R. Trepina, Holland, OH (US); Timothy B. Kowal, Maumee, OH (US); Richard C. Sayers, Akron, OH (US); Gennaro R. Martire, Perrysburg, OH (US); Richard D. Lohrman, Sylvania, OH (US)

(73) Assignee: Owens-Illinois Closure, Inc., Toledo, OH (US)

( * ) Notice: Subject to any disclaimer, the term of this patent is extended or adjusted under 35 U.S.C. 154(b) by 0 days.

(21) Appl. No.: 09/792,016

(22) Filed: Feb. 21, 2001

(51) Int. Cl.[7] ................................................. E01F 11/42
(52) U.S. Cl. ..................................................... 222/321.8
(58) Field of Search ......................... 222/153.14, 321.7, 222/321.8, 383.1

(56) References Cited

U.S. PATENT DOCUMENTS

| 4,127,221 A | | 11/1978 | Vere |
| 4,506,805 A | | 3/1985 | Marcon |
| 4,558,821 A | | 12/1985 | Tada et al. |
| 4,917,303 A | * | 4/1990 | Maas et al. ............... 222/321.7 |
| 5,114,052 A | | 5/1992 | Tiramani et al. |
| 5,152,436 A | | 10/1992 | Maas et al. |
| 5,564,604 A | * | 10/1996 | Tada ..................... 222/153.14 |
| 5,716,008 A | * | 2/1998 | Nottingham et al. .... 222/383.1 |

* cited by examiner

*Primary Examiner*—Philippe Derakshani
*Assistant Examiner*—Thach H Bui

(57) ABSTRACT

This articulated trigger/cover unit for a pump dispenser is formed with retainers on proximate relatively moveable walls to hold parts in stable configuration for handling by automatic assembly equipment.

7 Claims, 5 Drawing Sheets

ARTICULATED TRIGGER/COVER UNIT FOR A PUMP DISPENSER

FIELD OF THE INVENTION

This invention relates to an articulated trigger/cover unit for a pump dispenser. More specifically, this invention relates to a modification of the trigger/cover unit to assure that the hinged parts are reliably held in a given configuration during assembly of the pump by automatic assembly equipment.

BACKGROUND OF THE INVENTION

A pump dispenser of the type referred to above is thoroughly disclosed in the PCT patent application PCT/EP98/05554 which was published Mar. 11, 1999 and the national phase U.S. application Ser. No. 09/486,87 filed Mar. 2, 2000. The pump is structured so that the top surface is flat when the trigger is in repose, making the pump easy to handle and convey in assembly and to store. When the trigger is pulled, the short drive arm of the trigger humps up with the cover, moving the piston into the cylinder and increasing the height of the pivot to improve the angle between the piston and the trigger arm. This makes the pump easy to operate.

This invention relates to a modification of the trigger/cover unit which facilitates the assembly of the pump dispenser by automatic assembly equipment. More specifically, by the modification, the trigger/cover unit is reliably held in a predetermined shape—instead of a flopping, unpredictable shape—one unit to the next, and automatic assembly equipment is able to handle it.

SUMMARY OF THE INVENTION

The invention is, of course, defined in the claims. In summary, the invention is a trigger/cover unit of a pump dispenser as described modified to include retainers on proximate or contiguous relatively moving surfaces so that the retainers hold the trigger portion and the cover portion in the desired attitude in preparation for assembly.

BRIEF DESCRIPTION OF THE DRAWINGS

Further objects and features of the invention will be clear to those skilled in the art from a review of the following specification and drawings, all of which present a non-limiting form of the invention. In the drawings.

DESCRIPTION OF A PREFERRED EMBODIMENT

Figure 1:
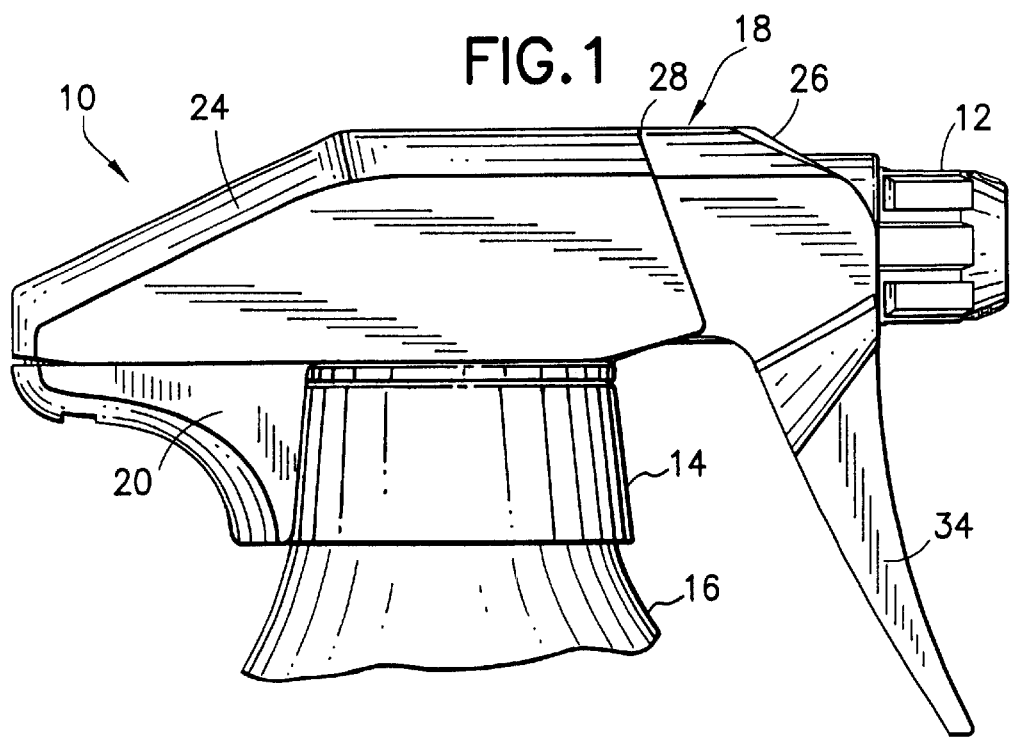
FIG. 1 is a fragmentary side view of a pump dispenser assembly including the trigger/cover unit in repose embodying the invention.
Figure 2:
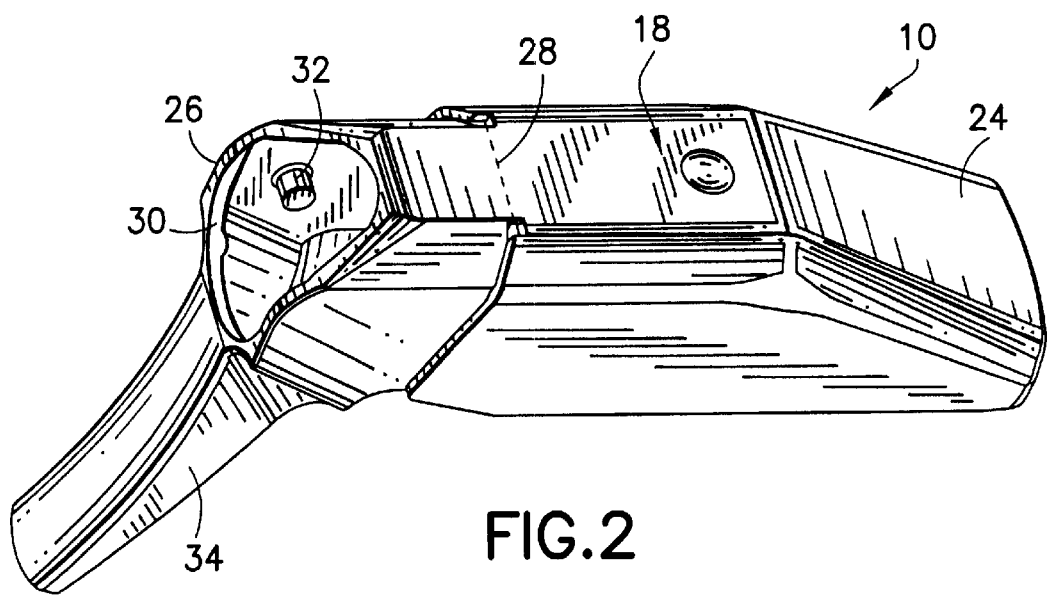
FIG. 2 is a perspective view of the trigger/cover unit by itself, revealing the nozzle opening and showing a pivot trunion.

A pump dispenser embodying the invention is shown in FIG. 1 and generally designated 10. The dispenser includes a nozzle 12 which is installed at the end of the pump body (not shown). The pump body is supported on a closure 14 which is screwed or otherwise fastened onto a container 16, shown in portion only.

A trigger/cover unit 18 is mounted over the pump body by being pivotally attached at the rear to a shelf 20 which is part of the pump body and secured to or part of the closure 14. The pivot may be in the form of a dart 22 (FIG. 3) molded integrally with the cover portion 24 and at the rear end thereof, the dart extending through a perforation, not shown, adjacent the distal end of the shelf.

As disclosed in the PCT patent referred to above, the unit 18 includes trigger portion 26 as well as the cover portion 24 joined thereto by a living hinge 28, the entire trigger/cover unit being molded in one piece. The cover portion is wider than the trigger portion where they overlap or are contiguous so that the portions telescope beneath the hinge 28 when the trigger is pulled. The trigger portion includes an opening 30 for the nozzle/piston assembly, and two opposed pivot trunions 32 extend inward from the side walls through slots (not shown) in the opposite sides of the cylinder to engage appropriate saddles (not shown) on the nozzle to assure linear movement of the piston.

Figure 1A:
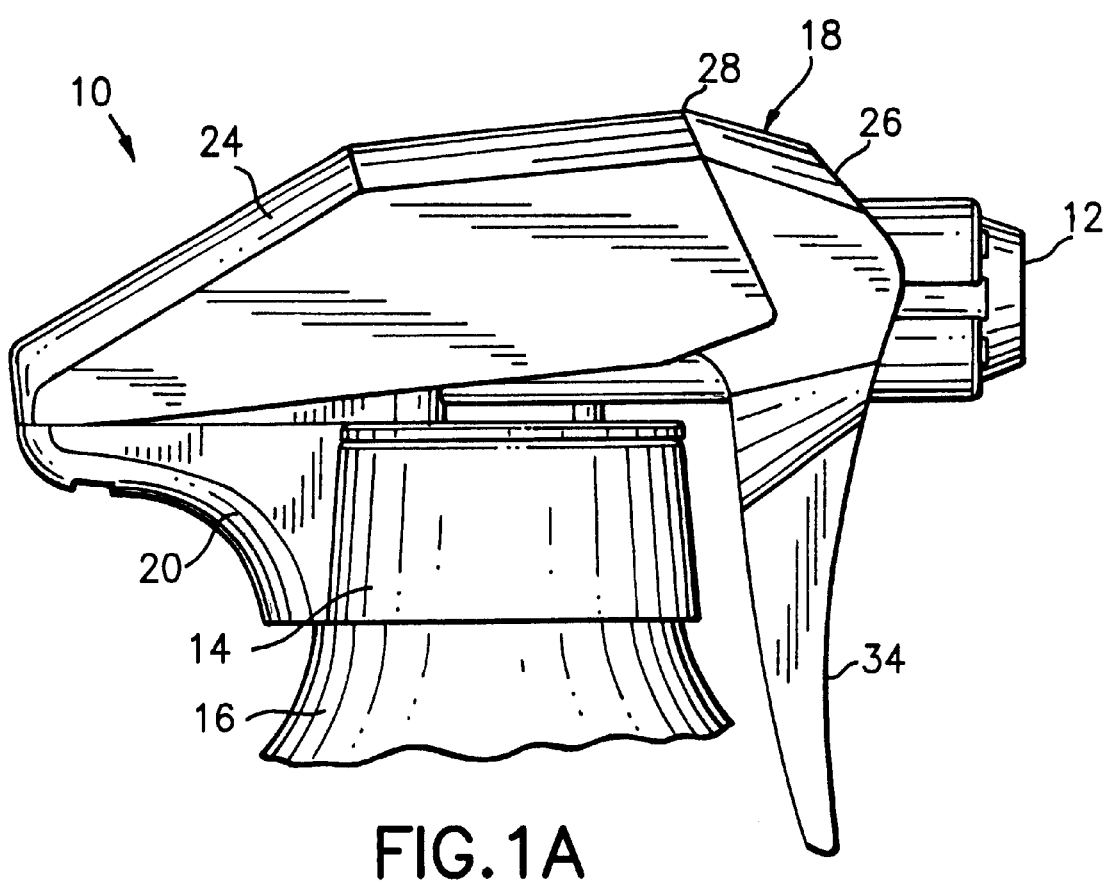
FIG. 1A is similar to FIG. 1 showing the trigger/cover unit with trigger pulled.

In operation, as explained in the PCT patent application, the pump is attached to a container 16, and the trigger lever 34 forming a distal part of the trigger portion is pumped by the user. Again, as explained in the PCT patent application, the pivot trunions 32 are constrain to a horizontal linear movement by slots in the pump cylinder (not shown). As a result, when the trigger is pumped, swinging about the trunions 32, the rearward end of the top arm of the trigger portion 26 adjacent the living hinge 28 raises (FIG. 1A), lifting with it the forward end of the cover portion 24 adjacent the living hinge 28. In this action, the trunions 32 and pivot dart 22 are drawn closer together, the trunions 32 moving the nozzle/piston assembly into the cylinder to achieve the pumping. The above action is all well described in the PCT patent application.

Figure 3:
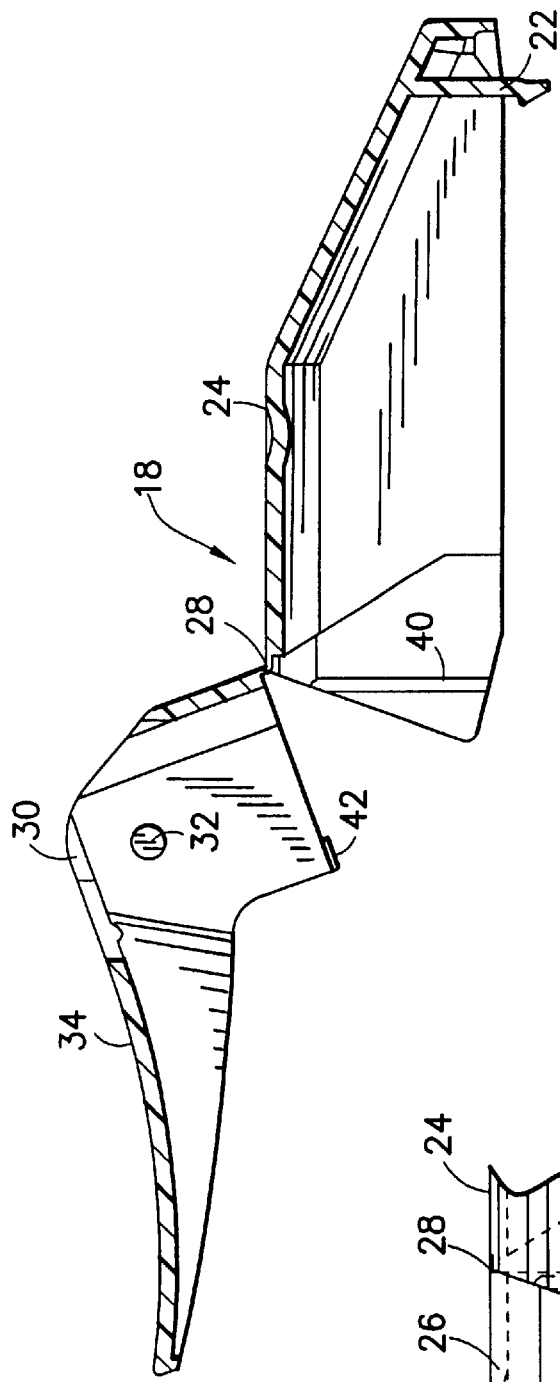
FIG. 3 is a sectional view of the trigger/cover unit having the trigger portion pivoted away from the cover portion as it is disposed when the unit is ejected from the mold.
Figure 5:
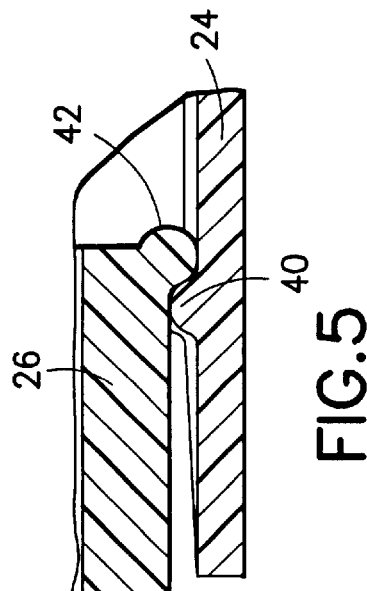
FIG. 5 is a fragmentary enlarged section view taken on the line 5—5 of FIG. 4.

Attention is now directed to the trigger and cover portions. As shown in FIG. 3, retainers in the form of detents are formed on proximate or contiguous relatively moving walls of the portions. More specifically, a generally vertical rib 40 is formed on the inside of both side walls of the cover portion. The trigger portion carries an outward nib 42 on the outside of each side wall, adapted when the trigger portion is pulled down from the FIG. 3 position toward the FIG. 5 position to snap over the respective ribs 40 and remain there against some urging of the natural orientation of the trigger and cover portions inherent because of their molded relationship (FIG. 3). The configuration will be such that the top surfaces of the trigger and cover portions lie in the same plane.

Figure 4:
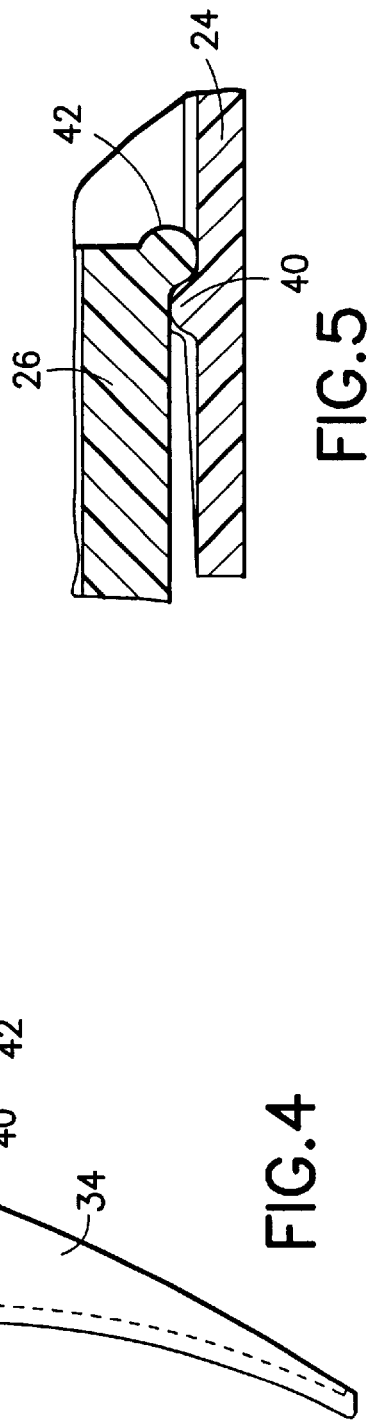
FIG. 4 is a fragmentary side view showing the trigger pivoted inward from FIG. 3 to a position whereat the detents engage and the unit is ready for introduction into automatic assembly equipment.
Figure 6:
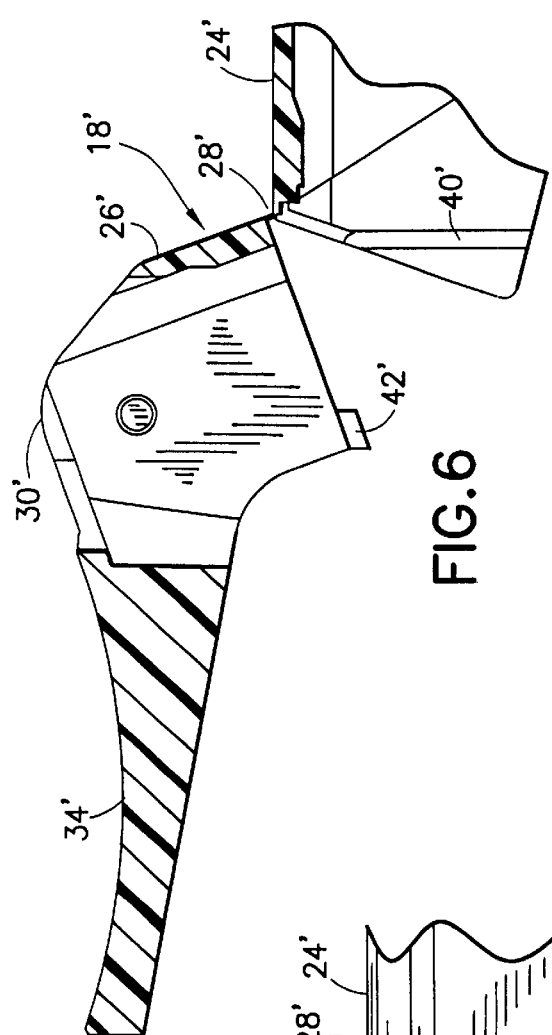
FIG. 6 is a view comparable to a portion of FIG. 3 and showing a second embodiment of the invention.

Thus, as a step of the assembly of the pump dispenser, the trigger/cover unit is pivoted about the living hinge 28 to the condition shown in FIG. 4, at which condition the parts are reliably restrained by the rib/nib detent combination 40, 42 which serves as a stop.

By having the trigger portion and the cover portion in the described condition (FIG. 4), the automatic assembly of complete pump dispensers of the type disclosed in the PCT application is clearly facilitated. There is no need for special holding guides to assure that the trigger/cover unit is in proper condition during the assembly. This is achieved by the provision of the detent ribs 40 and nibs 42 and their subsequent snapping engagement, i.e. past each other.

Second Embodiment

In the second embodiment the primed form of the same numerals is used to designate elements corresponding to the first embodiment.

Figure 8:
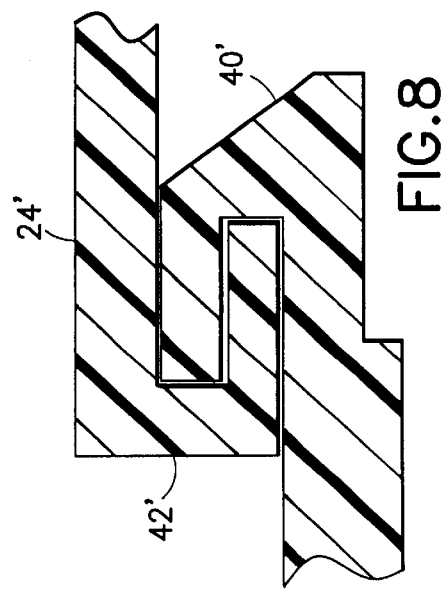
FIG. 8 is an enlarged fragmentary sectional view taken on the line 8—8 of FIG. 7.
Figure 7:
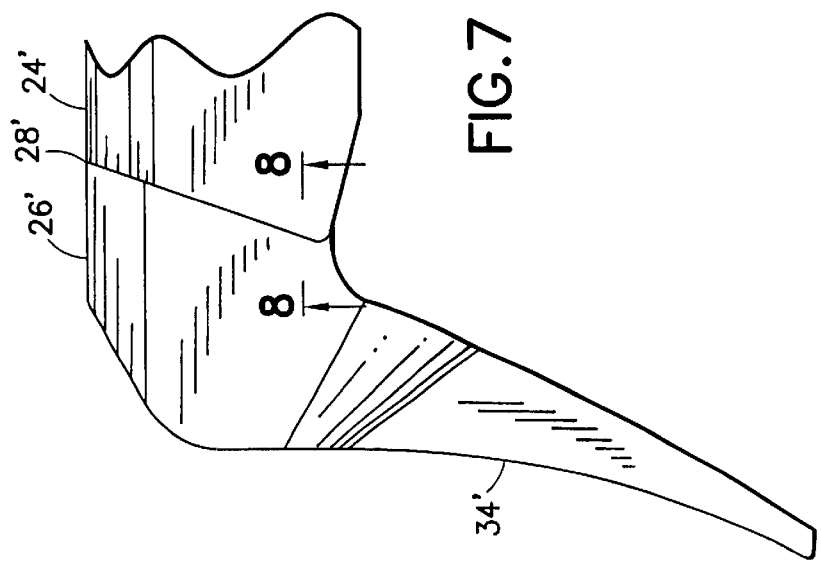
FIG. 7 is a view comparable to a portion of FIG. 4 of the second embodiment.
Figure 9:
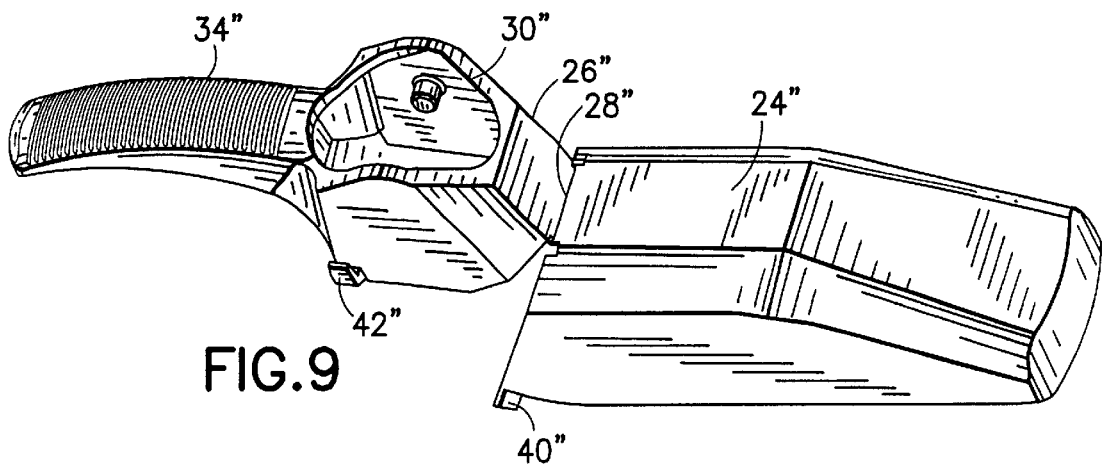
FIG. 9 is a perspective view of a unit incorporating a third embodiment of the invention and showing the trigger portion pivoted away from the cover portion as it is disposed when the unit is ejected from the mold.
Figure 10:
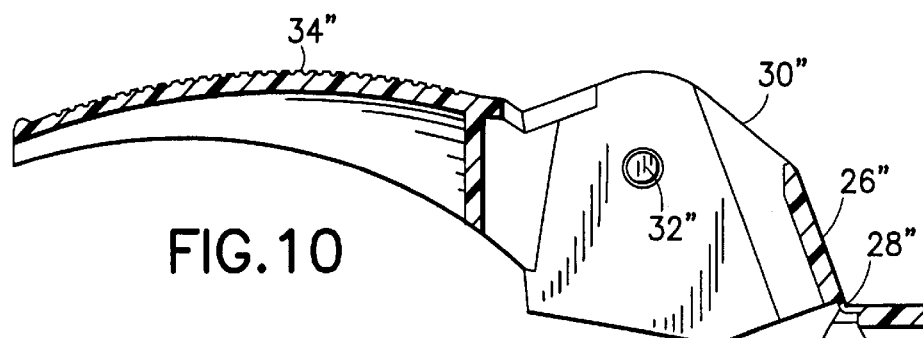
FIG. 10 is an enlarged fragmentary sectional view of the third embodiment comparable to the position of FIG. 3.
Figure 11:
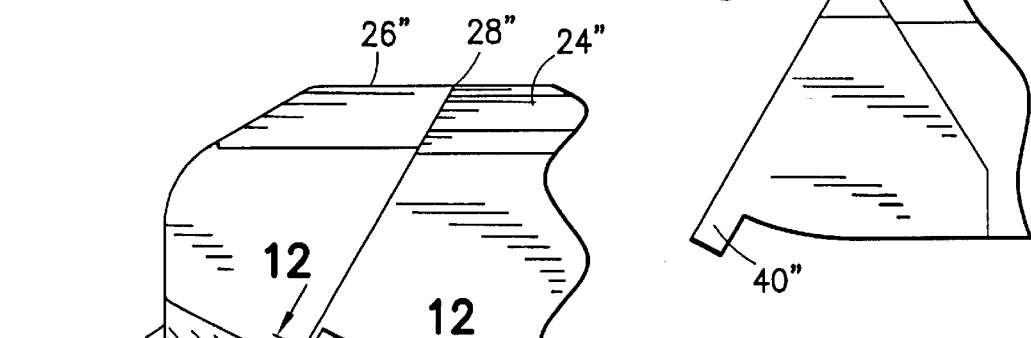
FIG. 11 is a fragmentary view of the third embodiment comparable to the view of FIG. 4.

The retainers of the second embodiment are in the form of two interfitting hooks 40' and 42'. The recess of hook 40' on the cover portion faces rearward, while the recess of the hook 42' on the trigger portion faces forward. When the trigger portion sidewalls telescope into the sidewalls of the cover portion, the two hooks interfit (FIG. 8) to hold the portions in stable position, the portions being biased toward the open position by the post-molding orientation of the portions.

Third Embodiment

In the third embodiment the double primed form of the same numerals is used to designate elements corresponding to elements of the first embodiment.

The retainers of the third embodiment are in the form of a hook 42" on the trigger portion and a tab 40" on the cover portion. The tab 40" extends downward on a forward corner of each cover sidewall. The hook 42" is on the rearward lower corner of each of the sidewalls of the trigger portion. The recess of each hook faces forward.

Figure 12:
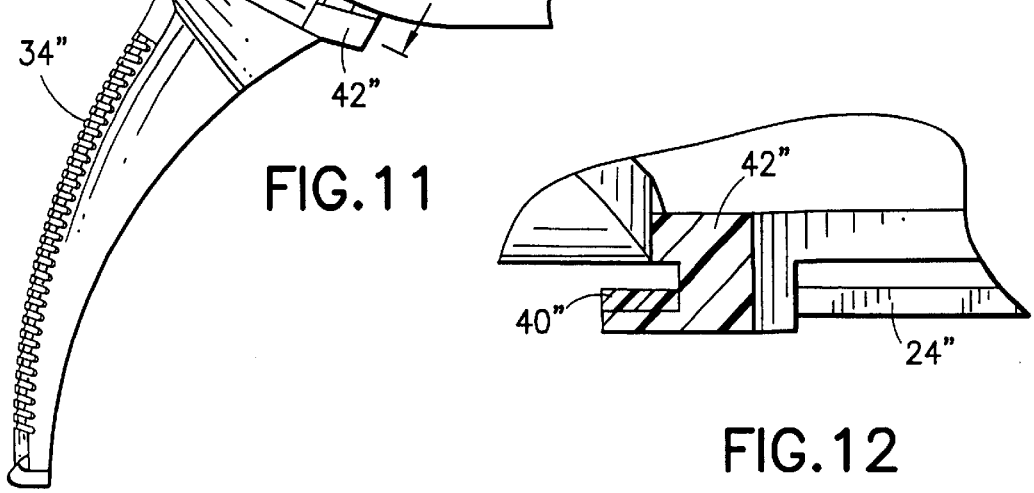
FIG. 12 is an enlarged fragmentary sectional view taken on the line 12—12 of FIG. 11.

In engagement the trigger portion is telescoped in between the walls of the cover portion so the hooks are past the tabs. The post-molding bias of the hinge 28 then urges the trigger portion outward and the hooks and tabs are engaged (FIG. 12).

Further variations in the invention are possible. Thus, while the product and method have been shown in a limited number of embodiments, it is not so limited but is of a scope defined by the following claim language which may be broadened by an extension of the right to exclude others from making, using or selling the invention as is appropriate under the doctrine of equivalents.

What is claimed is:
1. For a pump dispenser comprising:
   a. a pump body having a front end and a rear end and a downward portion for mounting on a container, the body having a pump cylinder portion having an open end facing the front end of the body and formed with slots along opposite sides of the open end; and
   b. a piston/nozzle unit reciprocable in the open end of the cylinder;

a trigger/cover unit comprising a cover portion having a forward and a rearward end, the rearward end adapted to be hingedly connected to the rear end of the pump body, and a trigger portion having an upper end, an intermediate portion and a lower trigger lever end, the upper end being connected by a living hinge to the forward end of the cover portion, the living hinge having an axis, the intermediate portion adapted to be pivotally connected to the piston/nozzle assembly through the slots, the forward end of the cover portion and the upper end of the trigger portion having opposite proximate telescoping side wall portions perpendicular to the axis of the living hinge, and retainers formed on the respective proximate wall portions for at least partly retaining the cover portion and the trigger portion in a predetermined relationship.

2. A trigger/cover unit as claimed in claim 1 wherein the retainers are detents comprising interfering projections on the respective contiguous wall portions.

3. A trigger/cover unit as claimed in claim 1 wherein the retainers comprise a pair of oppositely facing hooks on the respective contiguous sidewall portions, each hook comprising a recess and a distal end, the distal ends of each hook fitting into the recess of the other.

4. A trigger/cover unit as claimed in claim 1 wherein the retainers comprise a downward tab on one sidewall portion and a hook on the other contiguous sidewall portion, the hook engaging the tab.

5. A method of assembling a pump dispenser comprising the trigger/cover unit claimed in claim 1 including the step of engaging said retainers.

6. A process for assembling a pump dispenser comprising the steps of:
   a. providing a unit comprising a pair of molded elements connected together by a living hinge having an axis, the elements having proximate relatively moveable contiguous wall portions perpendicular to the axis of the living hinge,
   b. providing retainers on the respective contiguous wall portions,
   c. pivoting the elements into a configuration in which the retainers engage to hold the elements in the configuration, and
   d. assembling the unit with other parts of the pump dispenser.

7. A process as claimed in claim 6 wherein the unit is a cover/trigger unit.

* * * * *